United States Patent
Blackmon et al.

(10) Patent No.: US 6,532,953 B1
(45) Date of Patent: Mar. 18, 2003

(54) GEOMETRIC DOME STOWABLE TOWER REFLECTOR

(75) Inventors: James B. Blackmon, Brownsboro, AL (US); Nelson E. Jones, Los Osos, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/944,035

(22) Filed: Aug. 30, 2001

(51) Int. Cl.[7] ................................................. F24J 2/38
(52) U.S. Cl. ....................... 126/685; 126/691; 126/578; 126/696
(58) Field of Search ................................ 126/680, 685, 126/691, 578, 684, 690, 696, 589; 359/853, 870, 883, 848; 60/641.8, 641.15, 659

(56) References Cited

U.S. PATENT DOCUMENTS

| | | | |
|---|---|---|---|
| 4,491,388 A | | 1/1985 | Wood |
| 4,558,551 A | | 12/1985 | Sevelinge |
| 4,581,897 A | | 4/1986 | Sankrithi |
| 4,608,964 A | | 9/1986 | Russo |
| 4,625,709 A | | 12/1986 | Brandstatter |
| 4,919,527 A | * | 4/1990 | Saiylov et al. .............. 126/696 |
| 5,054,466 A | * | 10/1991 | White et al. ................ 126/600 |
| 5,325,844 A | * | 7/1994 | Rogers et al. .............. 126/605 |
| 5,578,140 A | | 11/1996 | Yogev |
| 5,685,151 A | * | 11/1997 | Ross ........................ 60/641.15 |
| 5,862,799 A | * | 1/1999 | Yogev et al. ............... 126/578 |
| 5,862,800 A | * | 1/1999 | Marko ........................ 126/651 |
| 5,882,434 A | * | 3/1999 | Horne ........................ 126/686 |
| 5,956,191 A | * | 9/1999 | Blackmon et al. .......... 359/846 |
| 5,979,438 A | | 11/1999 | Nakamura |
| 5,982,481 A | | 11/1999 | Stone |
| 6,036,323 A | * | 3/2000 | Meijer ........................ 126/685 |
| 6,231,197 B1 | * | 5/2001 | Nakamura .................. 126/569 |
| 6,336,452 B1 | * | 1/2002 | Tirey, Jr. .................... 126/578 |

FOREIGN PATENT DOCUMENTS

| | | |
|---|---|---|
| WO | WO 95/21358 | 8/1995 |
| WO | WO 00/33001 | 6/2000 |

OTHER PUBLICATIONS

U.S. patent application Ser. No. 09/604,224, James B. Blackmon, filed Jun. 27, 2000.
U.S. patent application Ser. No. 09/879,363, James B. Blackmon, filed Jun. 12, 2001.

\* cited by examiner

*Primary Examiner*—Henry Bennett
*Assistant Examiner*—Kathryn Ferko
(74) *Attorney, Agent, or Firm*—Harness Dickey & Pierce P.L.C.

(57) ABSTRACT

A geodome tower reflector for a beam down optics solar power system has three equidistantly spaced tower assemblies. A geodome reflector assembly is movably mounted to the plurality of tower assemblies for vertical movement along the plurality of tower assemblies. The geodome reflector assembly has a facet support structure. The facet support has a plurality of rigid frames to which facets are mounted. Each facet has a downwardly facing mirror for reflecting light from a heliostat to a receiver of the beam down optics solar power system.

14 Claims, 9 Drawing Sheets

GEOMETRIC DOME STOWABLE TOWER REFLECTOR

FIELD OF THE INVENTION

The present invention relates to solar thermal power systems, and more particularly, to geometric dome tower reflectors for solar thermal power systems.

BACKGROUND OF THE INVENTION

High concentration solar thermal power systems rely on parabolic trough or dish concentrators or a field of heliostats to track the sun and reflect solar radiation onto receivers to heat a working fluid and drive a power conversion system to produce electricity, or to provide this thermal energy for various industrial and commercial processes. Similarly, tracking photovoltaic systems ensure that the solar irradiance incident on the solar arrays meet the appropriate optical requirements. For concentrating solar arrays, the tracking system can have essentially the same requirements as for troughs, dishes or heliostats, and in principle, the configurations can be very similar.

One type of solar power system utilizes what is known as "beam down optics." A beam down optics solar power system has a tower mounted reflector to reflect concentrated sunlight from hundreds or thousands of heliostats surrounding it to the ground where the light is concentrated and directed into a receiver. One such beam down optics solar power system is shown in U.S. Pat. No. 5,979,438.

The major design requirement that beam down optics solar power systems must meet is that the tower reflector and tower must be able to withstand the static and dynamic loads imposed primarily by wind and gravity (weight of the reflector, weight of the reflector with additional loads due to ice, and combinations of wind and gravity induced loads). Wind induced dynamic loads (wind gusts) impose particularly severe effects that could cause failure of the tower reflector.

It is an object of this invention to provide a low cost, easily assembled tower reflector that meets the above design requirement.

SUMMARY OF THE INVENTION

A geodome tower reflector for a beam down optics solar power system in accordance with this invention has a plurality of tower assemblies, preferably three. A geodome reflector assembly is movably mounted to the tower assemblies, preferably by mounting to guide shoes which move along a vertically extending guide rail of each tower assembly. The geodome reflector assembly has a facet support structure having a plurality of rigid frames to which facets are mounted. Each facet has a downwardly facing mirror for reflecting light from a heliostat to a receiver of the beam down optics solar power system.

In an embodiment, each tower assembly includes a hoist cable attached to its guide shoe. The hoist cables are coupled to a hoist mechanism for raising and lower the guide shoes to raise and lower the geodome reflector assembly.

A spreader assembly preferably spans tops of the tower assemblies and is secured to the tower assemblies. A plurality of guy wires are attached at one end to guy wire anchors and at other ends to individual tower assemblies. The spreader assembly and guy wires stabilize the tower assemblies.

In an embodiment, the geodome reflector assembly includes a frame surrounding the facet support structure with the facet support structure mounted to the frame in tension so that loads are transferred from the facet support structure to the frame. Clevis assemblies are preferably used to mount the facet support structure to the frame.

The facet support structure preferably includes a plurality of rigid triangular frames to which the facets are mounted. Each facet also has an aiming mirror that faces upwardly to a camera of a digital image radiometer that is mounted on the spreader assembly at the center thereof, preferably where radial trusses that preferably form part of the spreader assembly are joined together. The digital image radiometer and the aiming mirrors are used to adjust the facets. In this regard, the triangular frames of the facet support structure are adjustable in orientation with respect to each other.

The components of the tower reflector are fabricated to permit assembly on location utilizing relatively unsophisticated tools. The tower assemblies are preferably prefabricated in sections for assembly on location, such by being bolted or welded together, and the geodome reflector assembly is comprised of parts that can be assembled together on location to form the geodome reflector assembly, such by bolting together or by welding.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
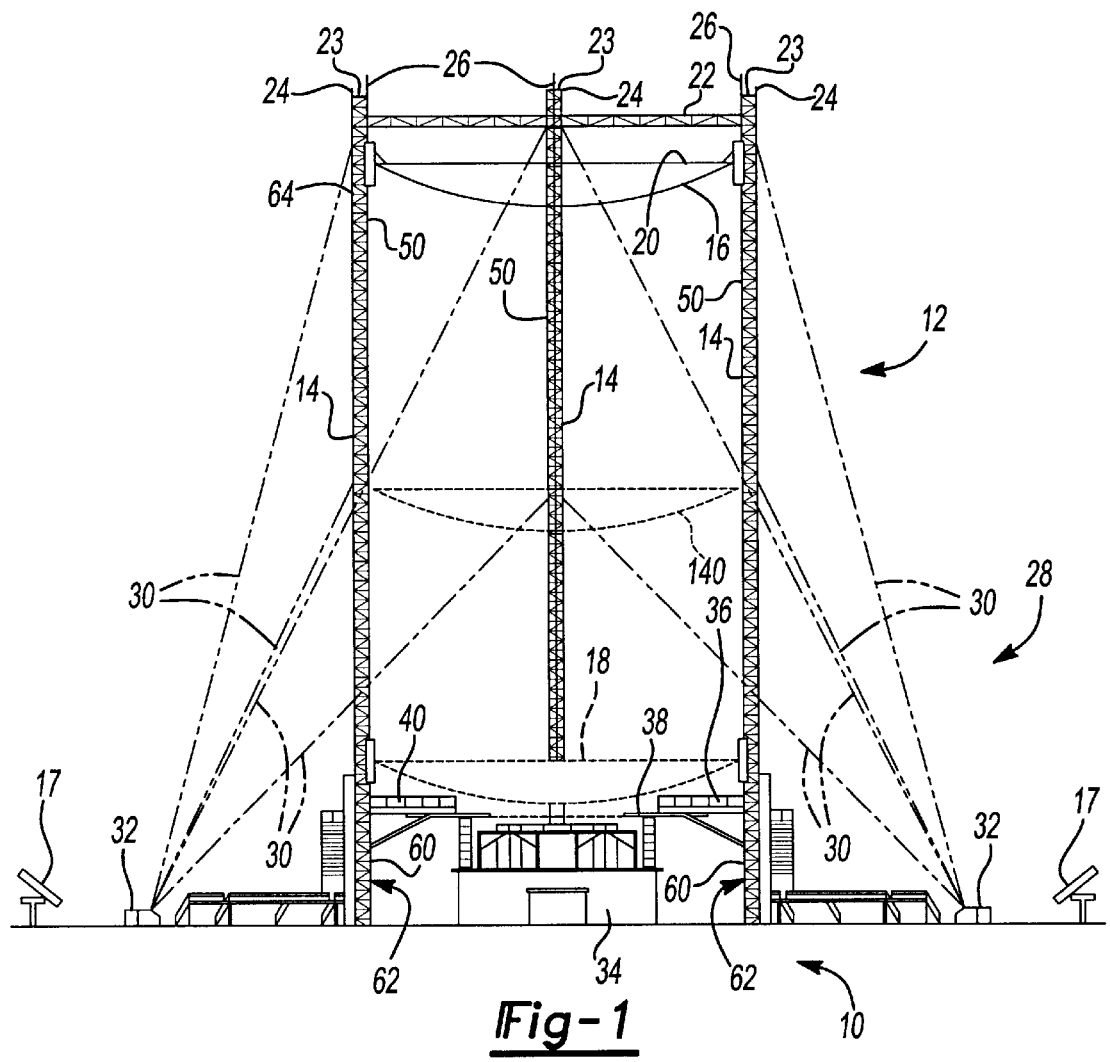
FIG. 1 is a diagrammatic view of a beam down optical power system with a geodome tower reflector according to the invention.

Referring to FIG. 1, a geodome tower reflector 12 in accordance with this invention is shown as part of a beam down optics solar power system 10. Geodome tower reflector 12 includes three tower assemblies 14, preferably positioned at the apexes of an equilateral triangle, and a geodome reflector assembly 16 movably supported on tower assemblies 14 for vertical movement between a lower position 18 (shown in dashed lines) and an upper, operational position 20 (shown in solid). Being able to move geodome reflector assembly 16 up and down facilitates assembly, particularly in remote areas, as geodome reflector assembly 16 need not be assembled in its upper operational position 20 several hundred feet in the air. In lower position 18, geodome reflector assembly 16 is close to ground and this location provides easy access to it for assembly, adjustment, inspection, maintenance, repair, as well as storage during high wind and hazardous weather conditions. Illustratively, the components of geodome tower reflector 12 are fabricated in small enough pieces so as to permit transport by truck or rail.

A spreader assembly 22 spans the tower assemblies 14 at or near the tops 23 of tower assemblies 14. Affixed to tops 23 of tower assemblies 14 are aircraft warning systems 24 and lightening protection systems 26.

Geodome tower reflector 12 has a tower stabilization system 28 that, in conjunction with spreader assembly 22, stabilizes tower assemblies 14. Tower stabilization system 28 illustratively comprises a plurality of guy wires 30. Lower ends of the guy wires 30 are anchored in respective guy wire anchors 32. Upper ends the guy wires 30 are attached to respective tower assemblies 14.

Beam down optics solar power system also includes a turbine/generator room 34, a receiver 36, shutter assembly 38 and work platforms 40. Geodome reflector assembly 16 reflects sunlight directed at it by heliostats 17 located around beam down optical power system 10 and onto receiver 36, which collects the light reflected thereon to heat high pressure air to high temperature and direct it into a turbine/generator (not shown) in turbine/generator room 34 for use therein in generating electricity.

Each tower assembly 14 is comprised of a series of horizontal tower members 42 (FIGS. 2 and 3) mounted in vertical spaced relation to each other to vertical tower members 44. Each tower assembly 14 illustratively has a triangular cross-section in that horizontal tower members 42 are illustratively triangular in shape and are mounted at their apexes to vertical tower members 44. Diagonal bracing members 46 interconnect adjacent horizontal tower members 42. Each tower assembly 14 also includes horizontal rungs 48 that extend up one side of tower assembly 14 to provide access to tower assembly 14 to maintenance personnel and the like. Each tower assembly 14 is preferably prefabricated in sections that can then be assembled on location, such as by bolting or welding the sections together.

A radially inwardly facing side 50 (FIG. 1) of each tower assembly 14 has a pair of opposed guide rails 52 (FIG. 3) extending vertically therealong. Opposed guide rails 52 are secured to guide rail attachment structures 54 which in turn are secured to vertical tower members 44 and, illustratively, to an inwardly facing leg of every third horizontal tower member 42. Guide shoes 64 of a hoist attachment structure 210 (FIG. 17) are received in guide rails 52.

Figure 17:
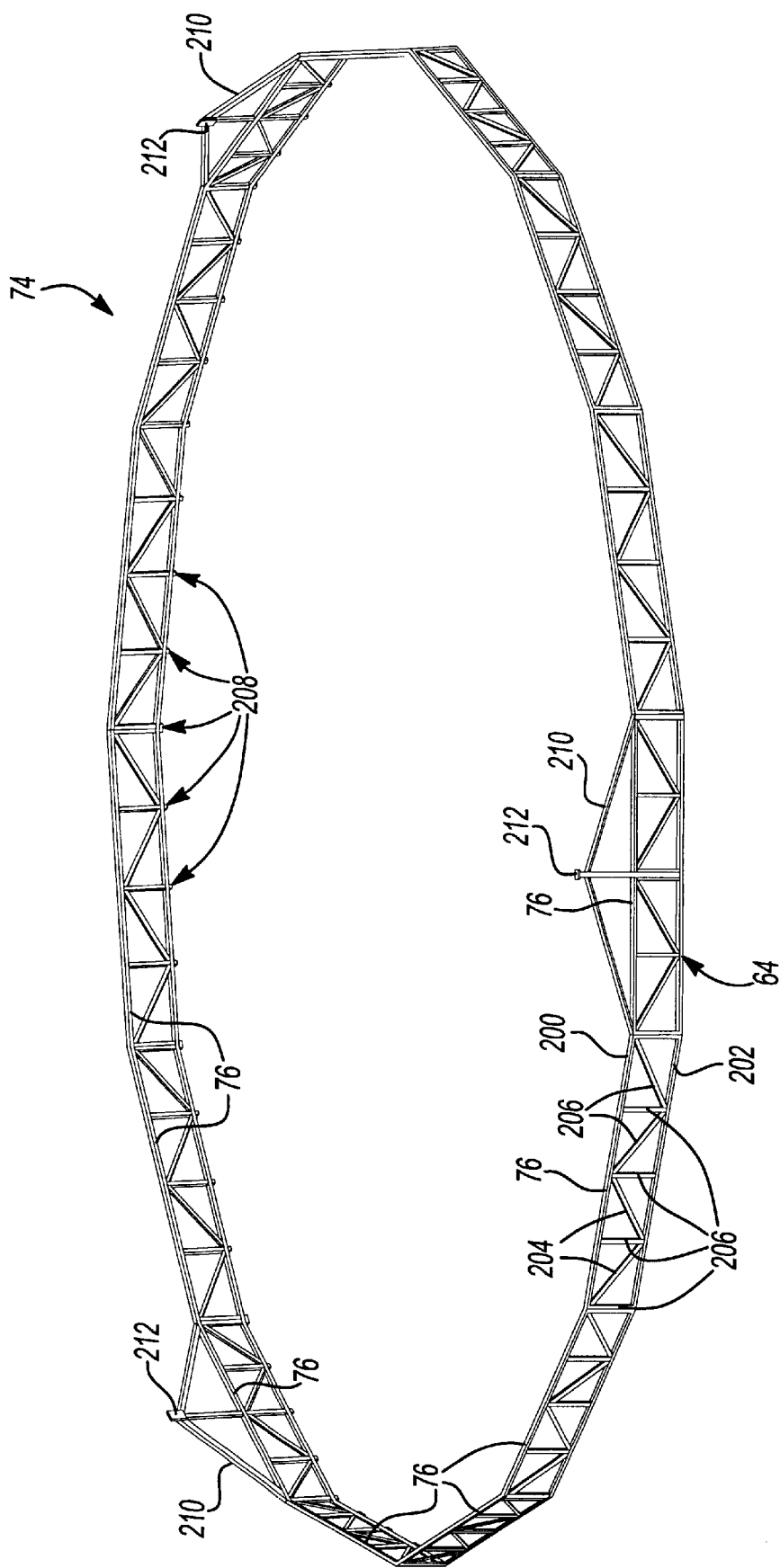
FIG. 17 is diagrammatic view of a frame for use in the geodome reflector assembly of FIG. 1.

Legs of horizontal tower members 42 on a side of each tower assembly 14 have a first set of cable guides 56 affixed thereto in spaced vertical relation to each other and legs of horizontal tower members 42 on a second side of each tower assembly 14 have a second set of cable guides 56 affixed thereto in spaced vertical relation to each other. A hoist cable 58 extends up through one set of cable guides 56 from a hoist mechanism 60, such as a winch, illustratively located in a lower part 62 (FIG. 1) of each tower assembly 14, and is coupled to guide shoe 64, such as by attachment to an attachment plate 212 of a hoist attachment structure 210 to which guide shoe 64 is affixed. (FIG. 17). Hoist cable 58 extends down and through the second set of cable guides 56 to hoist mechanism 60. Hoist mechanism 60 raises and lowers geodome reflector assembly 16 by raising and lowering guide shoes 64, such as by raising and lowering hoist attachment structures 210 of geodome reflector assembly 16 to which guide shoes 64 are mounted. In this regard, if hoist mechanism 60 comprises separate winches in each tower assembly 14, the winches are synchronized in known ways so that when the winches raise and lower hoist attachment structrues 210 of geodome reflector assembly, geodome reflector assembly 16 is kept level.

Coolant supply and return lines 66 extend up through at least one tower assembly 14 to the top thereof. Coolant lines 66 are secured in tower assembly 14 by coolant line attachment hardware that attaches the coolant lines 66 to the guide rail attachment structures 54. Coolant lines 66 are coupled at lower ends to coolant pump/heat exchanger system. An illustrative coolant pump/heat exchanger system that could be utilized is disclosed in U.S. Ser. No. 09/879,363 for a "Thermally Controlled Solar Reflector Facet with Heat Recovery" filed Jun. 12, 2001 and assigned to the assignee of this application.

Figure 5:
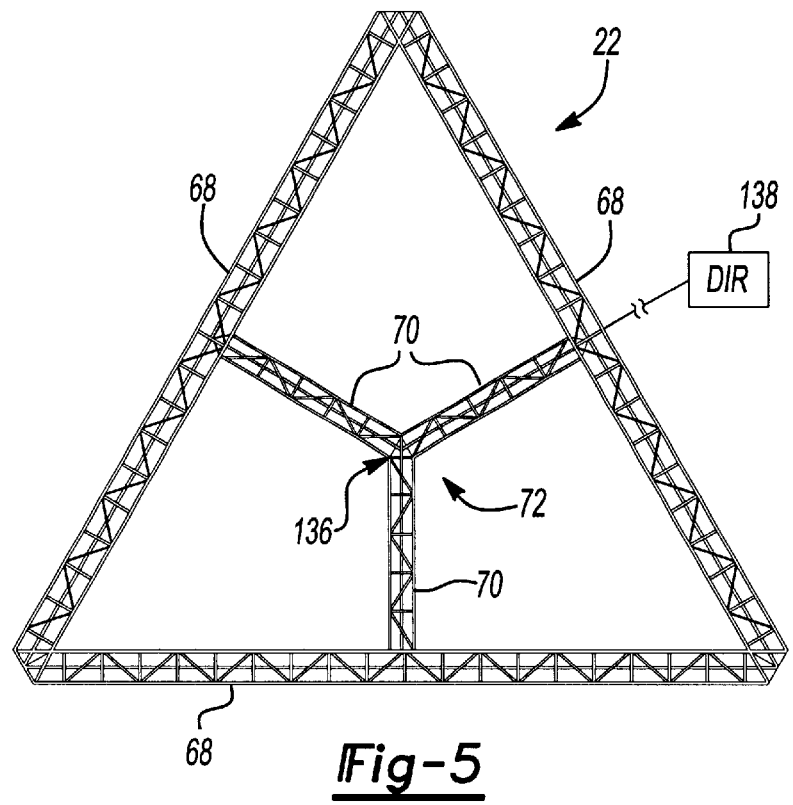
FIG. 5 is a top view of a spreader truss assembly for use in the geodome reflector of FIG. 1.

Turning to FIG. 5, spreader assembly 22 is described. Spreader assembly 22 includes three spreader trusses 68 that extend between respective tower assemblies 14, at or near tops 23 of tower assemblies 14, and are mounted to the respective tower assemblies 14. Radial trusses 70 are joined at one end at a center 72 of spreader assembly 22 and their other ends are mounted to the mid-points of respective spreader trusses 68. Spreader trusses 68 and radial trusses 70 are preferably prefabricated in sections for assembly on location, such as by bolting or welding the sections together. Spreader assembly 22 may be assembled at ground level and raised along guide rails 52 to the proper location where it is affixed to tower assemblies 14. Alternately, spreader assembly 22 may be assembled to tower assemblies 14 during the assembly of tower assemblies 14 and raised during the erection of tower assemblies 14.

Figure 8:
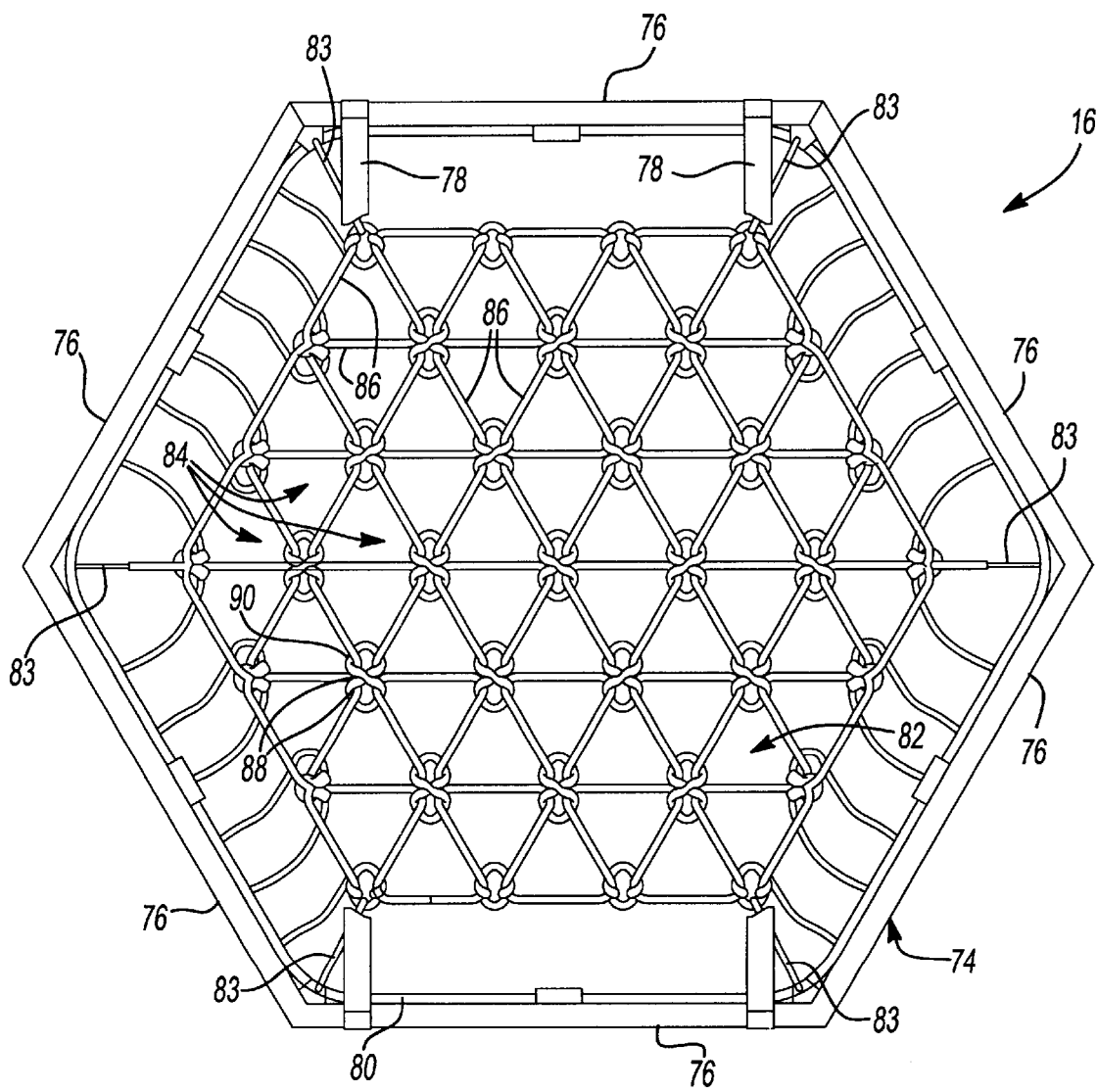
FIG. 8 is a top view of a geodome reflector test assembly having fifty-four facets.
Figure 18:
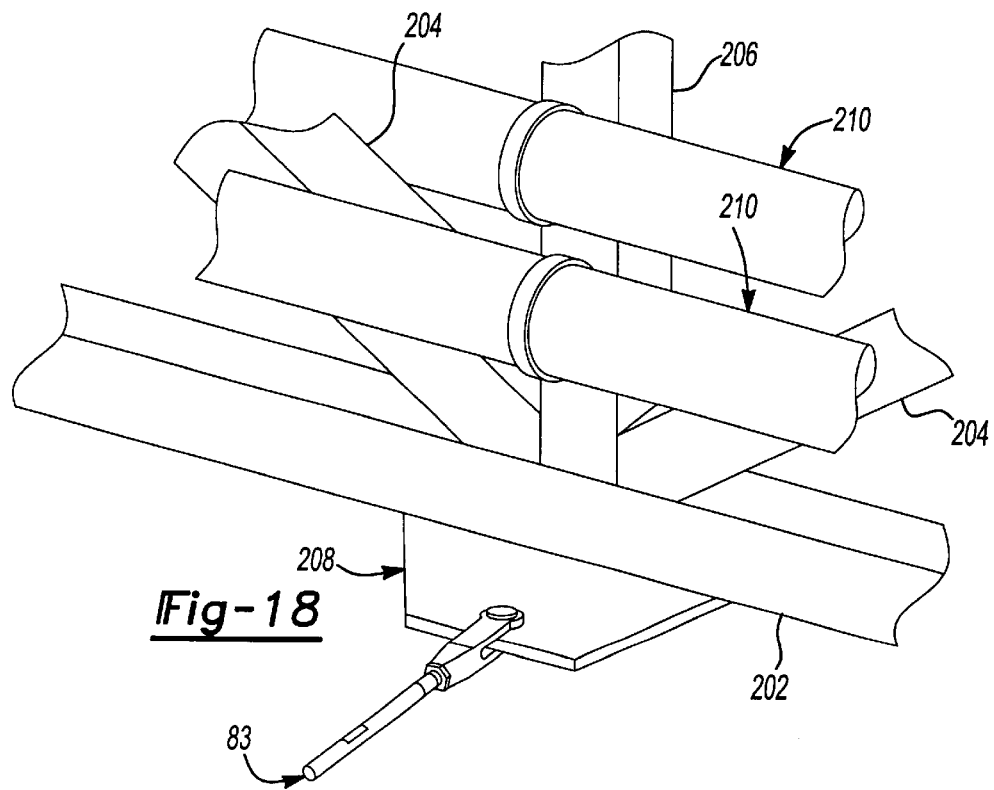
FIG. 18 is a side view of a portion of the frame of FIG. 17 where a clevis assembly is attached.

Turning to FIGS. 8, 17 and 18, an outer ring support structures for supporting a multitude of facets is described in greater detail. In this regard, it should be understood that the embodiment illustrated in FIG. 8, which has fifty-four facets, was a test assembly constructed for the purposes of testing aspects of this invention. It should be understood that a geodome reflector assembly 16 for actual use would be much larger, as discussed below.

Geodome reflector assembly 16, has a frame 74 made up of frame sections 76. In the test assembly embodiment shown in FIG. 8, frame 74 may include brace members 78 that extend transversely across frame 74 and are mounted to opposed frame members 76. A manifold 80 extends around frame 74 and is affixed thereto. Frame 74 and manifold 80 are preferably prefabricated in sections, such as frame sections 76, for assembly on location, such as by bolting or welding the sections together.

Figure 3:
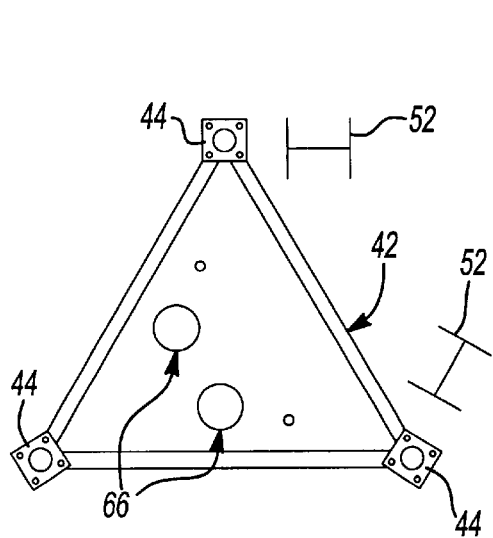
FIG. 3 is cross-section of the tower assembly of FIG. 2 taken along the line 3—3.
Figure 4:
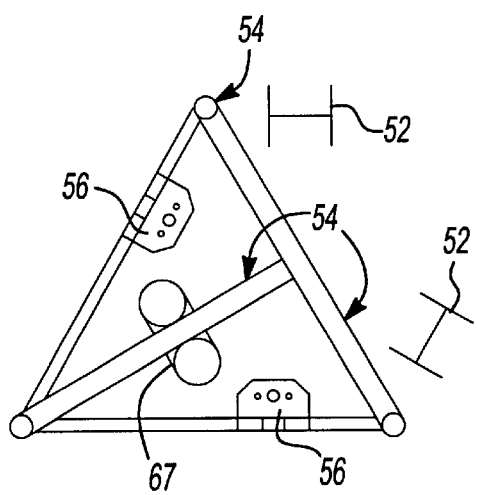
FIG. 4 is a cross-section of the tower assembly of FIG. 2 taken along the line 4—4.
Figure 2:
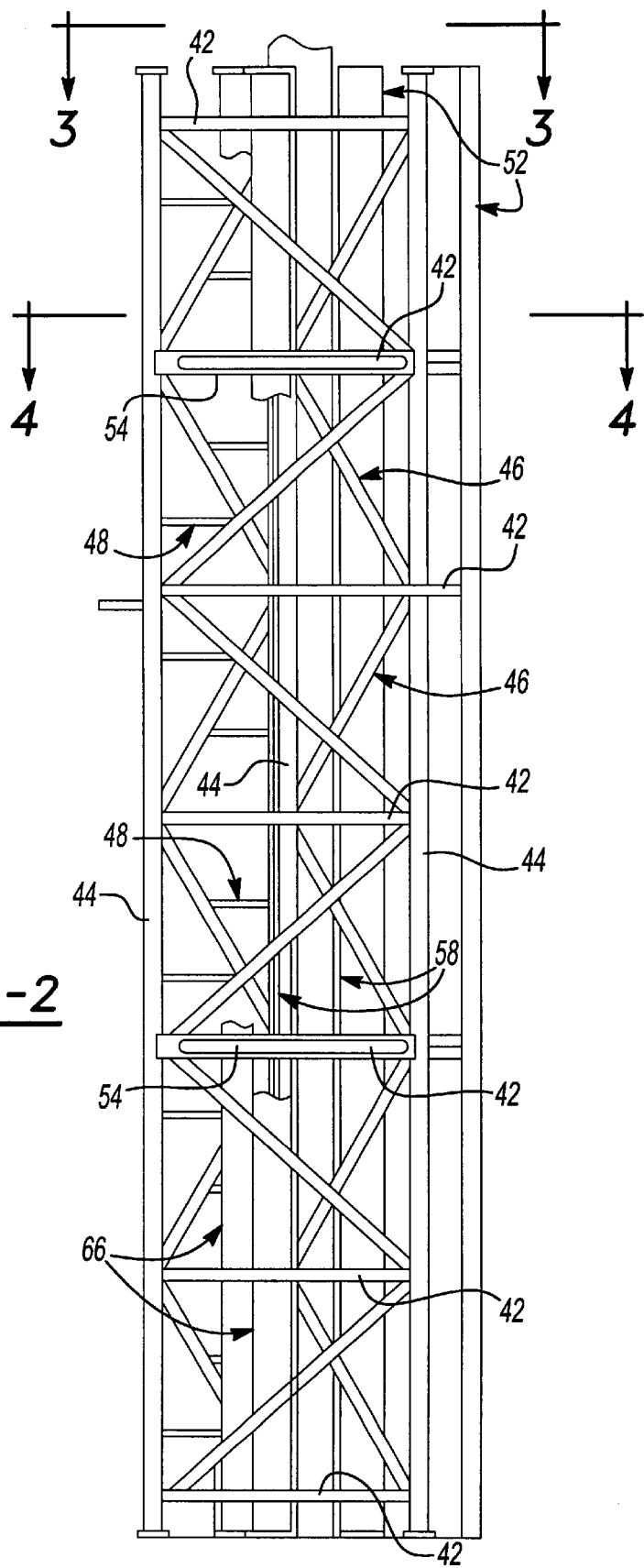
FIG. 2 is a side view of a vertical section of a tower assembly for use in the geodome tower reflector of FIG. 1.

Manifold 80 is coupled to coolant lines 66 (FIGS. 2 and 3), such as by hoses (not shown) held on self-retracting hose reels (not shown). Alternatively, coolant lines 66 terminate in quick connects (not shown) at or near the tops 23 of tower assemblies 14 and manifold 80 has corresponding quick connects (not shown) that mate with the quick connects of coolant lines 66 when geodome reflector assembly 16 is in its upper, operational position 20. In the embodiment shown in FIG. 18, coolant manifold 80 (FIG. 8) comprises supply and return coolant manifolds 210 that couple to coolant supply and return lines 66 (FIGS. 2 and 3).

With specific reference to FIGS. 17 and 18, frame 74 as it would illustratively be constructed for use in the field, such as in a 10 megawatt system having 1920 facets as described below, is shown in greater detail. Frame 74 would illustratively have fifteen frame segments 76 and frame 74 would surround facet support structure 82 (described below) that would support the appropriate number of facets 108, such as 1920 facets 108 for a 10 megawatt system, as described in more detail below. Each frame segment 76 illustratively comprises an upper structural member 200, a lower structural member 202, vertical structural members 206, and cross-brace structural members 204. Structural members 200, 202, 204, 206 are illustratively made of square steel tube. Commercially available fence sections for livestock corrals used for horses and cattle can illustratively be used for frame segments 76. Inwardly extending attachment plates 208 are affixed around inner edges of frame 202 at the junction of each vertical support member 206 and lower support member 202 of each frame section 204. Frame 74 further includes three hoist attachment structures 210, spaced equidistantly around frame 74, each having a hoist attachment plate 212 to which one end of a respective hoist cable 58 (FIG. 3) is attached.

A facet support structure 82 is mounted to frame 74, such as by a plurality of tensioning assemblies, such as turnbuckle or clevis assemblies 83. With reference to FIGS. 17 and 18, one end of each clevis assembly 83 is mounted to one of attachment plates 208 of frame 74. Clevis assemblies 83 are tensioned so that facet support structure 82 is mounted to frame 74 in tension. This transfers loads from the facet support structure 82 to frame 74, which in turn transfers the loads to tower assemblies 14, which are stabilized against the loads by tower stabilization system 28 in conjunction with spreader assembly 22.

Figure 9:
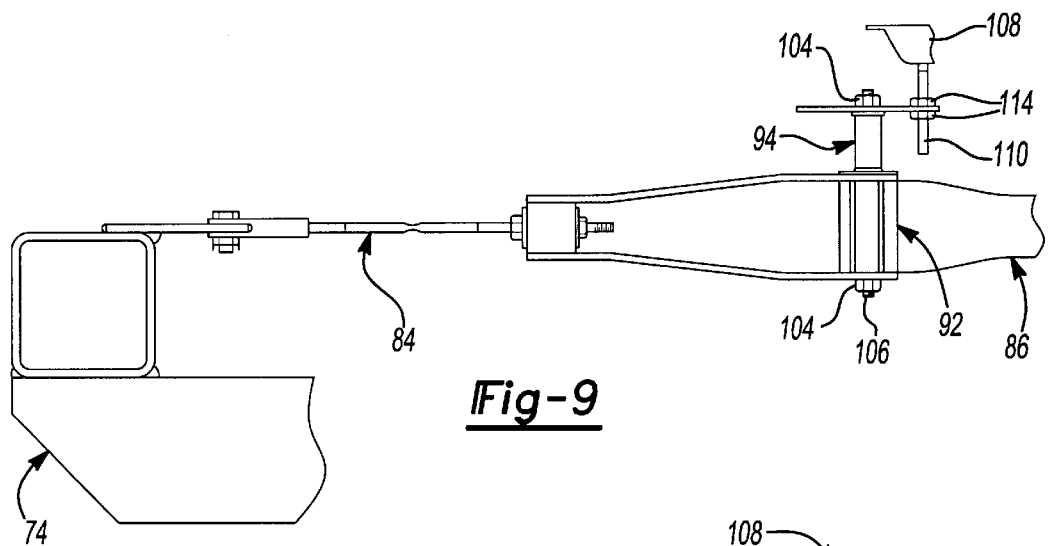
FIG. 9 is a side view of a clevis assembly of the geodome reflector assembly shown in FIGS. 8 and 18.
Figure 10:
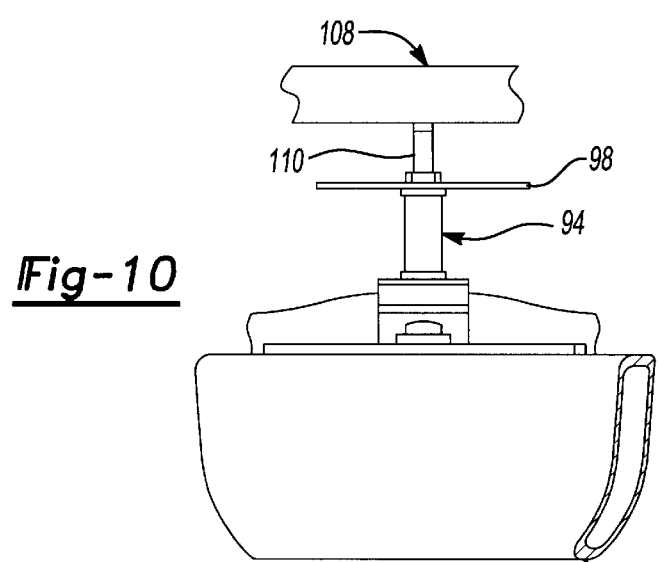
FIG. 10 is a side view of the clevis assembly of FIG. 9 rotated ninety degrees.
Figure 11:
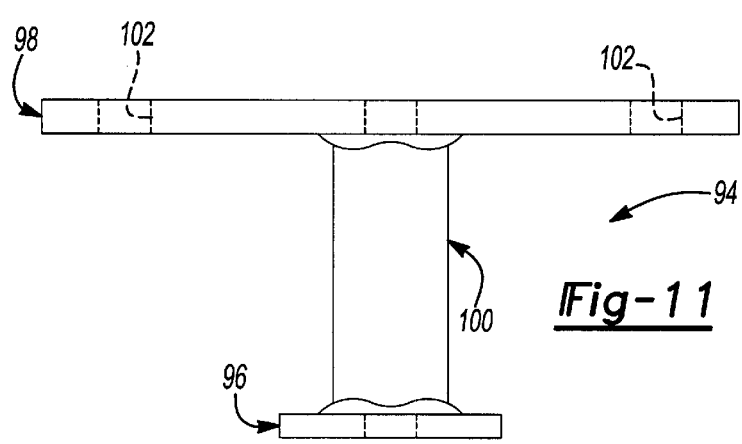
FIG. 11 is a side view of a facet mounting spool of FIG. 10.

Facet support structure 82 is illustratively a kit made by Geometrica, Inc., 908 Town and Country Blvd., Suite 330, Houston, Tex. 77024 and sold under the tradename Freedome. Facet support structure 82 includes a plurality of stiff triangular frames 84 secured together at their apexes. Triangular frames 84 are illustratively formed by three tubular struts 86 secured together at their ends. In this regard, each strut 86 has a crimped end 88 mounted to ends 88 of adjacent struts 86 at a node 90 by strut end mounting fixtures 92 (FIG. 9). Strut end mounting fixtures 92 are included in the Freedome kit and comprise extruded, slotted fixtures where the crimped ends 88 of the struts are inserted into the slots and secured therein, such by bolts and nuts (not shown). However, strut end mounting fixtures 92 have one of their washers replaced with facet mounting spools 94. Strut end mounting fixtures 92 permits ends 88 of struts 86 to be loosened with respect to each other to adjust the orientation of triangular frames 84 with respect to each other, thus adjusting the orientation of facets 108 (FIG. 12), and tightened to secure ends 88 of struts 86 together so that triangular frames 84 are rigid and secured to each other so as to prevent movement of one frame 84 with respect to adjacent frames 84. Further, the Freedome kit permits assembly of facet support structure 82 on location by assembling triangular frames 84 by securing the ends 88 of struts 86 together with strut end mounting fixtures 92.

Facet mounting spool 94 has a first washer 96, which replaces the washer of the strut end mounting fixture 92 that is included in the Freedome kit, a second washer 98 and a sleeve 100 extending between the centers of the first and second washers 96, 98. Second washer 98 is larger in diameter than first washer 96 and has three holes 102 that extend axially therethrough spaced equidistantly around its periphery. Facet mounting spool 94 is secured to strut end mounting fixture 92 by nuts 104 and bolt 106.

Figure 16:
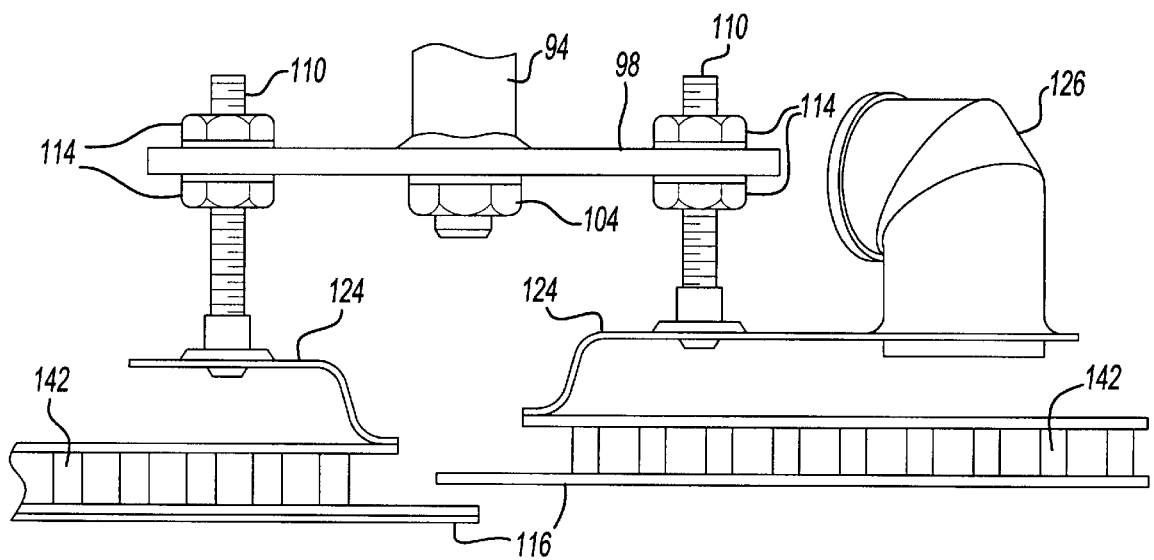
FIG. 16 is a cross-sectional view, partially broken away, of two facets of FIG. 15 mounted on a facet mounting spool.

Each facet 108 is preferably triangularly shaped (FIG. 12) and has a threaded mounting stud 110 extending normally therefrom at each apex 112 of a cover plate 124. The threaded mounting studs 110 are inserted through one of holes 102 in the second washers 98 of adjacent facet mounting spools 94 and secured therein by nuts 114 (FIGS. 9 and 16). Cotter pins (not shown) are preferably inserted through mounting studs 110. Holes 102 are preferably oversized to allow for some adjustment of facet 108. Except around the periphery of facet mounting structure 82, apexes of three facets 108 are mounted to each facet mounting spool 94. Facet mounting spools 94 are preferably prefabricated and assembled on facet support structure 82 on location.

Figure 12:
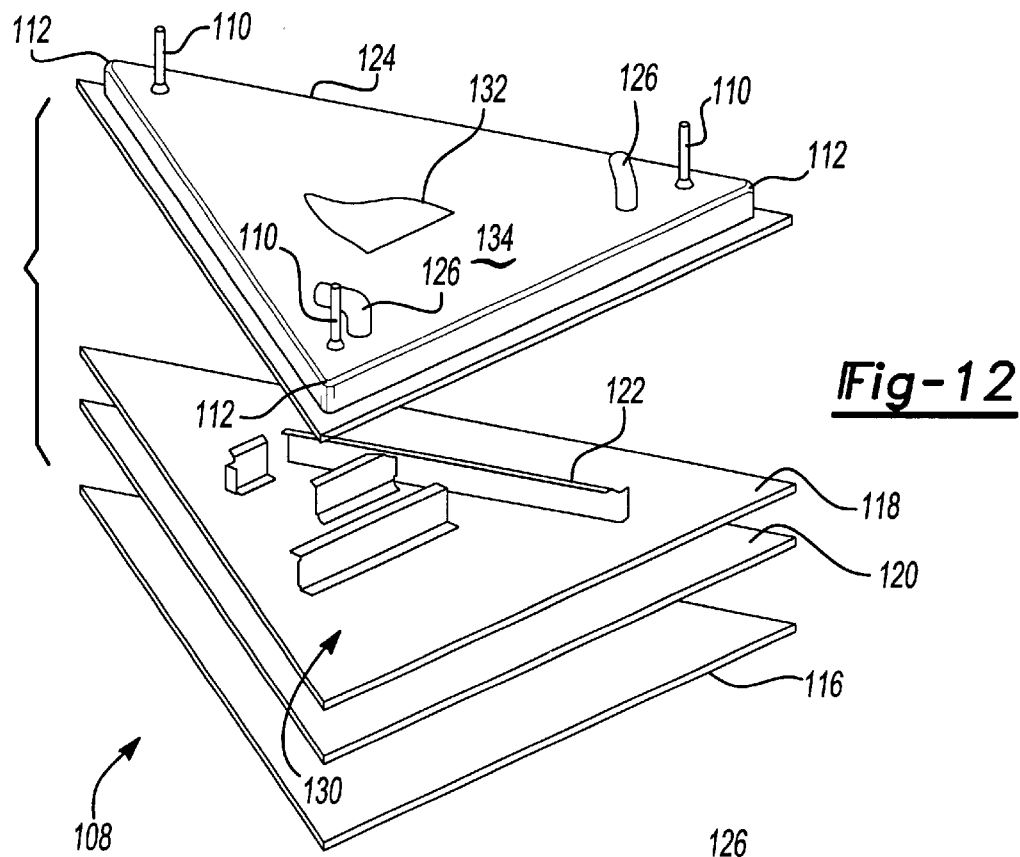
FIG. 12 is an exploded assembly view of a facet.
Figure 13:
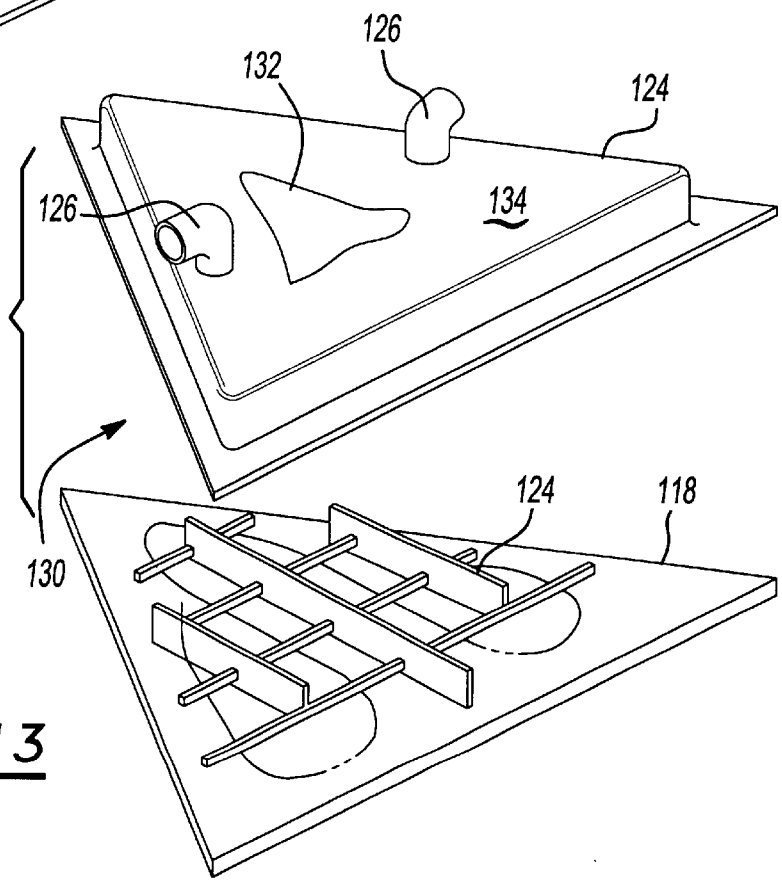
FIG. 13 is a partial exploded assembly view of a facet.

Turning to FIG. 12, each facet 108 has a mirror 116 secured to a face plate 118, such as by a layer of adhesive 120. Face plate 118 has a plurality of baffles 122 mounted thereon that provide a flow path for coolant. In this regard, the arrangement of baffles 122 on face plate 118 can be varied to provide different flow paths for the coolant water to provide for optimum cooling. An alternative arrangement of baffles 122 is shown in FIG. 13. Baffles 122 also preferably provide stiffening to add moment of inertia to face plate 118 to minimize optical deflection when facet 108 is pressurized with coolant.

Figure 14:
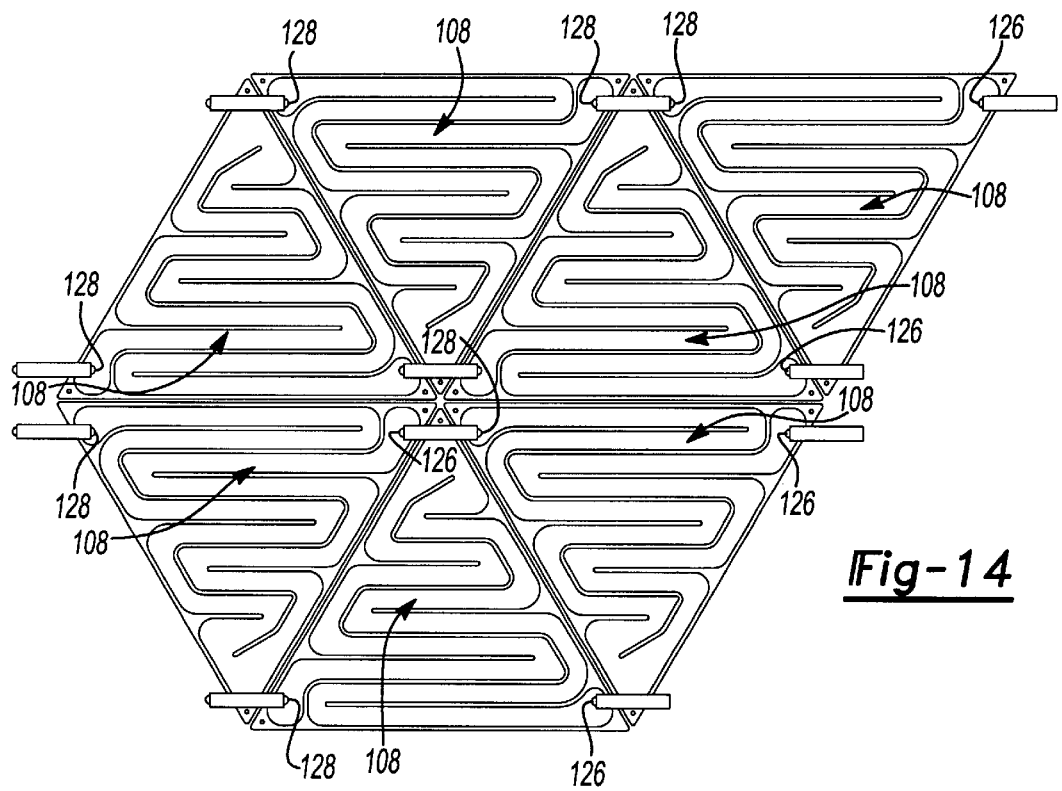
FIG. 14 is a top perspective view of a portion of a geodome reflector assembly of this invention showing the coolant ports of the facets interconnected and with the cover plates of the facets removed.

Cover plate 124 is secured to face plate 118, which define an interior 130 therebetween. Cover plate 124 has coolant ports 126 that open to interior 130. Coolant ports 126 of the facets 108 are interconnected (FIG. 14) so that coolant water flows from one facet 108 to another facet 108. The facets 108 located at the outer periphery of facet support structure 82 have their coolant ports 126 coupled to manifold 80 of frame 74 of geodome reflector assembly 16.

An aiming mirror 132 is mounted on an outer surface 134 of cover plate 124 and is parallel to mirror 116. Facets 108 are preferably prefabricated and mounted on facet mounting spools 94 on location with coolant ports 126 interconnected to each other and to manifold 80 on location.

Figure 15:
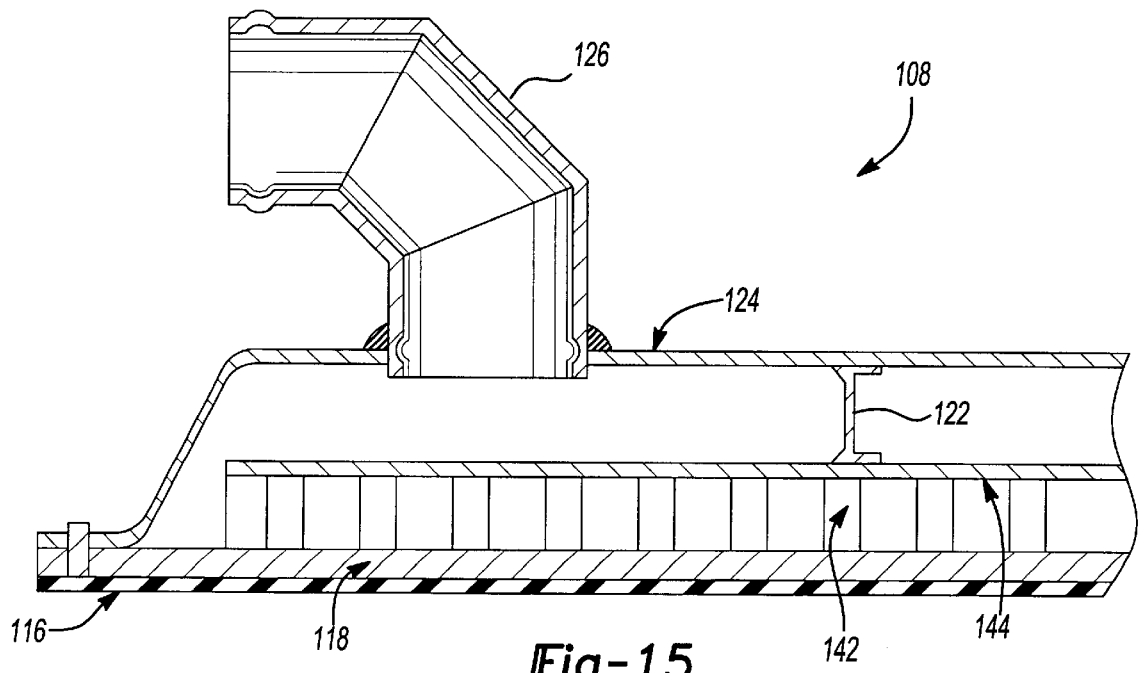
FIG. 15 is a cross-section of a portion of an alternative facet having a honeycomb layer.

A facet 108 can also include a honeycomb layer 142 (FIGS. 15 & 16) to provide additional rigidity for facet 108. Honeycomb layer 142 can illustratively be made of metal or plastic. Honeycomb layer 142 is illustratively sandwiched between face plate 118 and an inner plate 144 of facet 108. The baffles 122 are then mounted on inner plate 144.

Facets that can illustratively be used for facets 108 are described in U.S. Ser. No. 09/604,224 filed Jun. 27, 2000 for a "Composite Backed Prestressed Mirror for Solar Facet,"

assigned to the assignee of this application and the above referenced U.S. Ser. No. 09/879,363 for a "Thermally Controlled Solar Reflector with Heat Recovery." In this regard, the structure of facet 108 is illustrative and facets having other structures, such as rectangular structures, can be utilized in the present invention.

Facets 108 are mounted in facet support structure 82 so that mirrors 116 face downwardly and aiming mirrors 132 face upwardly. A camera 136 (FIG. 5) of a digital image radiometer 138 is mounted to spreader assembly 22 at the junction of radial trusses 70 at the center 72 of spreader assembly 22. Digital image radiometer and aiming mirrors 132 of facets 108 are used to aim or align geodome reflector assembly 16 in accordance with the teachings of U.S. Pat. No. 5,982,481 for an Alignment Sensor and Method for Dish Concentrators, which is incorporated by reference herein. In this regard, geodome reflector assembly 16 is lowered to alignment position 140, shown in dashed lines in FIG. 1, where it is aligned. When geodome reflector assembly 16 is in alignment position 140, DIR camera 136, in accordance with the teachings of the '481 patent, would be at a distance from vertex of geodome reflector assembly 16 that is twice the focal distance.

Figure 6:
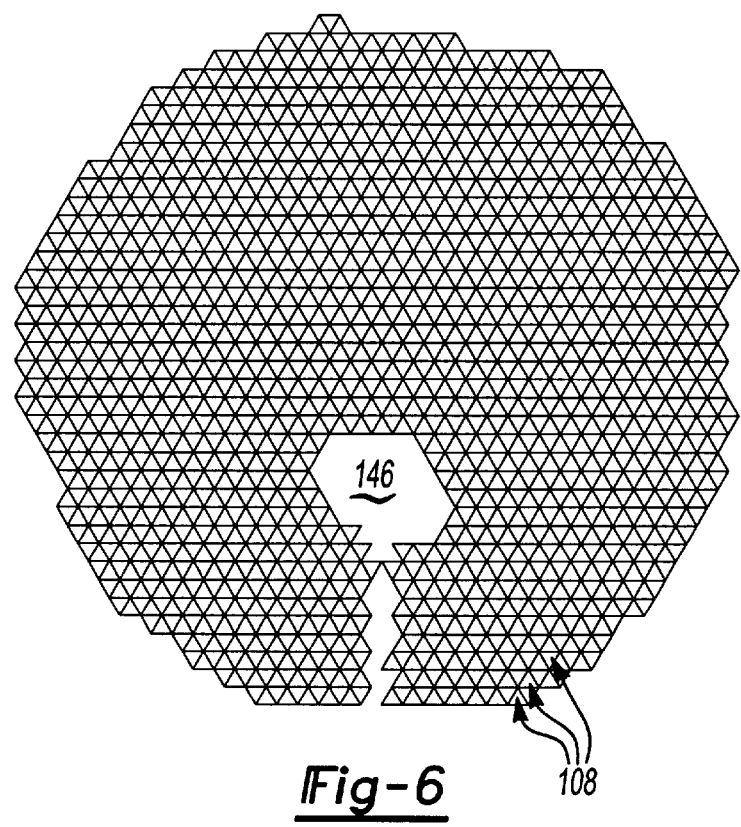
FIG. 6 is a bottom view of a geodome reflector assembly for use in the geodome tower reflector of FIG. 1.

Geodome reflector assembly 16 is preferably a hyperbolic geodesic dome opening concavely upwardly. As such geodome reflector assembly 16 has areas 146 (FIG. 6) where facets 108 cannot be oriented to reflect light from heliostats 17 to collector 36 and geodome reflector assembly 16 would therefore typically not have facets 108 in areas 146.

Figure 7:
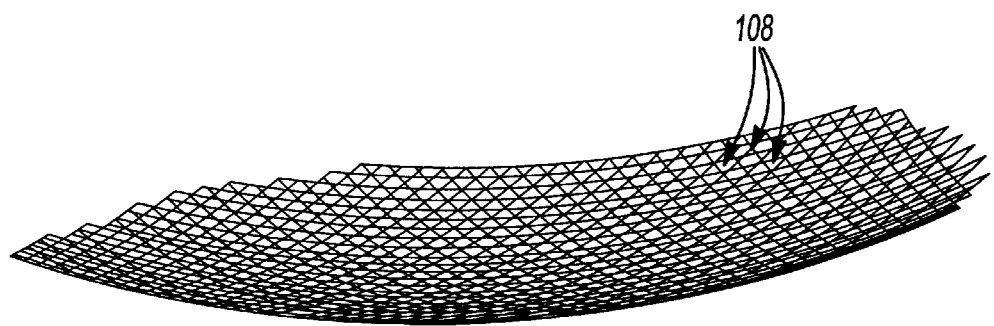
FIG. 7 is a side view of the geodome reflector assembly of FIG. 6.

Geodome reflector assembly 16 is sized according to the amount of power that beam down optics solar power system is designed to produced. For example, for a 10 megawatt plant, geodome reflector assembly 16, shown in FIGS. 6 and 7, would illustratively be hyperbolic in shape, have around 1953 triangular facets 108 (most having thirty inch legs) and would be fifty to sixty meters in diameter. The basic hyperbolic shape of geodome reflector assembly 16 is achieved by frame 74 and facet support structure 82, with more accurate adjustment of the facets 108 provided by their mounting arrangement to facet support structure 82 by facet mounting spools 94. In this regard, to achieve the hyperbolic geodesic dome shape, differently sized facets 108 would be used at appropriate positions on facet support structure 82. Applicants have found that the geodesic dome shape can be achieved using four differently sized facets 108, with the majority of the facets 108 having thirty inch legs. It should be understood that the size of the facets 108 can vary depending upon factors such as the size of mirror stock available, weight of the complete assembly, including anticipated weight of ice that can accumulate on facets 108, and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A geodome tower reflector for a beam down optics solar power system, comprising:
   (a) a plurality of tower assemblies;
   (b) a geodome reflector frame movably mounted to the plurality of tower assemblies for vertical movement along the plurality of tower assemblies;
   (c) a geodome reflector assembly mounted within the frame and having a facet support structure, wherein the facet support structure includes a plurality of rigid frames;
   (d) a plurality of facets mounted to the facet support structure in tension whereby a load applied to the facet support structure is transferred from the facet support structure to the frame, said plurality of facets having a downwardly facing mirror for reflecting light from a heliostat to a receiver of the beam down optics solar power system.

2. The apparatus of claim 1 wherein the plurality of tower assemblies are prefabricated in sections for assembly on location and the geodome reflector assembly is comprised of parts that can be assembled together on location to form the geodome reflector assembly.

3. The apparatus of claim 1 wherein the plurality of tower assemblies comprise three equidistantly spaced tower assemblies, each tower assembly including at least one vertical extending guide rail receiving a guide shoe mounted to the geodome reflector frame that moves vertically along the guide rail.

4. The apparatus of claim 3 wherein each tower assembly includes a hoist cable coupled to the guide shoe on one end and to a hoist mechanism on the opposite end, for raising and lowering the guide shoes that are mounted to the geodome reflector frame.

5. The apparatus of claim 3 further including a spreader assembly that spans tops of the tower assemblies and is secured to the tower assemblies, the apparatus further including a plurality of guy wires attached at one end to guy wire anchors and at other ends to individual tower assemblies, the spreader assembly and guy wires stabilizing the tower assemblies.

6. The apparatus of claim 5 wherein the spreader assembly comprises three spreader trusses, each spreader truss extending between two tower assemblies so that each tower assembly is connected to the other tower assemblies by one of the spreader trusses, the spreader assembly further including three radial trusses that extend from a center of each spreader truss to a center of the spreader assembly where the radial trusses are joined together.

7. The apparatus of claim 1 wherein the facet support structure is mounted to the frame by a plurality of clevis assemblies, each clevis assembly affixed to the facet support structure and the frame and extending therebetween.

8. The apparatus of claim 1 wherein the facet support structure includes a plurality of rigid triangular frames having facets mounted thereto, each facet having a mirror that faces downwardly when the facet is affixed to one of the triangular frames of the facet support structure.

9. The apparatus of claim 8 wherein the triangular frames are adjustable in orientation with respect to each other.

10. The apparatus of claim 9 wherein the triangular frames are comprised of rigid rods secured at their ends and to ends of rigid rods of adjacent triangular rods by strut end mounting structures, the strut end mounting structures including facet mounting spools to which the facets are mounted.

11. The apparatus of claim 8, wherein the plurality of tower assemblies comprise three equidistantly spaced tower assemblies, the apparatus further including a spreader assembly that spans tops of the tower assemblies and is secured to the tower assemblies, the apparatus including a digital radiometer optical alignment system having a digital radiometer camera mounted to spreader assembly at the center of the spreader assembly and aimed downwardly at the geodome reflector assembly, the facets having an aiming mirror affixed to a top surface thereof, the aiming mirrors and the digital infrared radiometer alignment system used to align the facets of the geodome reflector assembly.

12. A geodome tower reflector for a beam down optics solar power system, comprising:
(a) three equidistantly spaced tower assemblies, each tower assembly having a vertically extending guide rail that receives a guide shoe mounted to the geodome reflector assembly that moves vertically along the guide rail;
(b) a spreader assembly that spans tops of the tower assemblies and is secured to the tower assemblies to assist in stabilizing the tower assemblies;
(c) the guide shoes coupled to a hoist mechanism that raises and lowers the guide shoes along their respective guide rails to raise and lower the geodome reflector assembly; and
(d) the geodome reflector assembly having a facet support structure mounted in tension to a frame that surrounds the facet support structure so that loads are transferred from the facet support structure to the frame, and from the frame through the guide shoes to the tower assemblies, the facet support structure including a plurality of rigid frames to which facets are mounted, each facet having a downwardly facing mirror for reflecting light from a heliostat to a receiver of the beam down optics solar power system.

13. The apparatus of claim 12 wherein the facet support structure is mounted to the frame by a plurality of clevis assemblies, each clevis assembly affixed to the facet support structure and the frame and extending therebetween, the facet support structure including a plurality of rigid triangular frames having the facets mounted thereto.

14. The apparatus of claim 13 wherein the triangular frames are adjustable in orientation with respect to each other and are adjusted so that the geodome reflector assembly is hyperbolic in shape opening concavely upwardly.

* * * * *